(12) United States Patent
Chen et al.

(10) Patent No.: US 7,720,026 B2
(45) Date of Patent: May 18, 2010

(54) METHOD TO ESTABLISH AND ORGANIZE AN AD-HOC WIRELESS PEER TO PEER NETWORK

(75) Inventors: Wai Chen, Parsippany, NJ (US); Jasmine Chennikara-Varghese, Somerset, NJ (US); Marcus Pang, Manalapan, NJ (US); Toshiro Hikita, Fort Lee, NJ (US); John Lee, Howell, NJ (US); Shengwei Cai, Florham Park, NJ (US)

(73) Assignees: Telcordia Technologies, Inc., Piscataway, NJ (US); Toyota Infotechnology Center, U.S.A., Inc. (JP)

( * ) Notice: Subject to any disclaimer, the term of this patent is extended or adjusted under 35 U.S.C. 154(b) by 428 days.

(21) Appl. No.: 11/329,527

(22) Filed: Jan. 11, 2006

(65) Prior Publication Data

US 2006/0176847 A1 Aug. 10, 2006

Related U.S. Application Data

(60) Provisional application No. 60/643,373, filed on Jan. 11, 2005.

(51) Int. Cl.
*H04W 4/00* (2009.01)

(52) U.S. Cl. ............. 370/328; 370/331; 455/404.2; 455/446

(58) Field of Classification Search ........... 370/328, 370/331; 455/446, 404.2
See application file for complete search history.

(56) References Cited

U.S. PATENT DOCUMENTS

| 6,628,620 | B1 * | 9/2003 | Cain | 370/248 |
| 7,120,681 | B2 * | 10/2006 | Frelechoux et al. | 709/221 |
| 7,177,295 | B1 * | 2/2007 | Sholander et al. | 370/338 |
| 2001/0043585 | A1 * | 11/2001 | Hummel | 370/351 |

* cited by examiner

*Primary Examiner*—Patrick N Edouard
*Assistant Examiner*—Chuck Huynh
(74) *Attorney, Agent, or Firm*—Philip J. Feig

(57) ABSTRACT

A method for organizing and maintaining an ad-hoc network for communication between a plurality of moving devices is disclosed. The method comprises the steps of grouping the plurality of moving devices into at least one local peer group (LPG), ordering the plurality of devices within each LPG based upon a relative position of each of the plurality of devices within each LPG and assigning a unique identifier for each of the plurality of moving devices, where the unique identifier is based, in part on the LPG that the corresponding moving device is located.

15 Claims, 12 Drawing Sheets

METHOD TO ESTABLISH AND ORGANIZE AN AD-HOC WIRELESS PEER TO PEER NETWORK

RELATED APPLICATIONS

This application is related to and claims the benefit of U.S. Provisional Application No. 60/643,373 filed on Jan. 11, 2005.

BACKGROUND OF THE INVENTION

1. Field of Invention

This invention relates to an ad-hoc wireless network for a communication in a mobile environment. More specifically, the invention relates to the establishment and maintenance of a moving-device to moving-device ad-hoc wireless network to achieve near-instantaneous communications.

2. Description of Related Art

Wireless technology has become common in all aspects of life today, whether it be a wireless home or office network, so-called "hotspot" networks at local cafes, fast food chains or hotels, or even citywide implementations of WiFi technologies. The aim of this wireless push in society is to provide accessibility to information and to increase the productivity that society as a whole has enjoyed through the wide acceptance and utilization of computer networks and especially the Internet. Wireless networking technology, such as 802.11a/b/g, allows WiFi-enabled devices to connect to each other as they would in a standard wired network without the restriction of wires. People are given the freedom to remain connected to a network regardless of their physical location within the network coverage area.

With this goal in mind, several cities have attempted to create a wireless network for the city. For example, on Jul. 29, 2004, Grand Haven, Mich. claimed the distinction of being the "first WiFi city in America" with its implementation of a citywide wireless network covering the 6 square miles of the city and extending 15 miles into Lake Michigan. Many city officials see WiFi as an infrastructure necessity, much like sewage, power, telephone and transportation, for attracting and retaining business. The benefits of such systems for the city administrators are many, ranging from providing communication among city employees to providing public service announcements, advisories and other useful information to the citizenry at large.

In this drive for greater wireless connectivity, one area of everyday life has lagged behind. The roads and highways of America have remained largely untouched by wireless technology beyond rudimentary satellite and cellular phone systems. However, there are many advantages to be gained from wireless network technology implementations on American roads. Among the most notable are traffic advisories, Amber alerts, weather advisories, etc., which could be relayed to all vehicles that may be affected on an immediate basis.

Further, networking automobiles together allows the relay of information about a vehicle that may affect other vehicles in the vicinity. For example, an automobile may suddenly brake; this action could be reported to all vehicles behind the braking automobile instantaneously, thus allowing the drivers of the other vehicles to take necessary action with less urgency. This aspect has clear implications for reducing traffic accidents and congestion. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from a stationary infrastructure. Vehicles communicate with each other when they are within the same radio range of each other or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 mili-seconds) and sustained throughput (or equivalently, the percentage of neighboring vehicles that successfully receive warning messages) in order to support various VSC applications such as collision avoidance.

Simply installing wireless antenna on a moving vehicle and then transmitting uncoordinated communications would not suffice for satisfying these requirements. Specifically, by transmitting uncoordinated data, the airwaves would be flooded with a plurality of messages, which would result in a jamming of the radio waves, as the radio bandwidth is limited.

As such, these vehicles would interfere with each other's transmission and compete with each other for radio bandwidth for transmission. Further, all messages would propagate in all directions without any consideration of a desired transmission direction.

Additionally, each vehicle would not match other vehicles' network configurations.

The high mobility and lack of inherent relationships make a priori configuration of vehicles into vehicle groups problematic (e.g., a vehicle does not know anything beforehand about its neighbor). All information that is necessary for setting up safety communications must be exchanged in near real-time among vehicles, and vehicles in the groups must configure themselves in near real-time so that safety communication can take place. The high mobility of uncoordinated vehicles implies frequent change of neighbors or vehicle groups, and poses difficulties of using support-servers (for mobility, address, name, media session) within vehicle groups. These key differences make existing tactical ad-hoc networking technologies not directly applicable to vehicle groups for safety communications.

Using WiFi methods employed elsewhere, such as hotspots, are impractical because of coverage, data traffic volume and latency issues. A normal rush hour commute around a major city could yield a vehicle density of as much as 600 vehicles per 1200-meter length of a 3-lane highway. In addition, all these vehicles are moving through individual coverage areas at a rate of 30 to 60 mph. Most wireless systems are not equipped to handle such a large rate of change in their network.

Specifically, as a vehicle enters the coverage area, it would need to be identified and issued configuration instructions by a wireless access point or router. When a vehicle leaves the coverage area, the wireless access point or router would need to update its records to remove the vehicle form its network. Thus, the speed of a vehicle through a particular coverage area determines how often updating information, e.g. handshaking, needs to be broadcast by the wireless access point or router and responded to by all of the vehicles in range. All of these vehicles transmitting information at the same time could very easily overwhelm the system in short order.

Several attempts have been made to establish a vehicle-to-vehicle communication network. For example, FleetNet and CarTalk2000 have both developed a vehicle-to-vehicle communication network. Both of these systems use a GPS system in each vehicle for location information and to route messages. FleetNet uses both fixed and moving nodes as the infrastructure for "ad-hoc" networks. The fixed node can act as a server router, a gateway router and a client server router. This use of a plurality of fixed nodes causes a significant financial cost and overhead to set up, maintain, and manage the infrastructure. Additionally, the FleetNet system only uses position based routing and location awareness to relay messages. Specifically, as the backbone for their system, position data plays a crucial role in the communication protocols deployed.

CarTalk 2000 also uses a position-based protocol. Each vehicle participating in the CarTalk2000-based inter-vehicle system must be equipped with GPS devices to detect its current position at any given time. Additionally, CarTalk2000 uses multiple different routing protocols, such as Topological Information Routing, Procedure Routing, and Reactive Routing—such as Ad-hoc On-demand Distance-Vector Protocol, Dynamic Source Routing, Hybrid Routing, etc. Each of these routing protocols uses a complex and distinct set of protocol rules.

A major drawback of the CarTalk2000 system is the discovery that neighboring nodes significantly increases bandwidth traffic. Each node periodically sends a beacon to its neighboring cars reporting its existence. In high traffic areas this would result in constant beacon message collision.

However, these GPS networks have a significant drawback. In a high-mobility vehicle environment, the GPS information quickly becomes outdated. The exchange of constantly changing GPS information among vehicles, in order to perform GPS-positional routing, incurs too much protocol overhead and wireless bandwidth waste. As a result, such GPS-positional routing technology cannot achieve minimal communication latency or sustained multiple-hop throughput.

Accordingly, there exists a need to create an ad-hoc network capable of achieving the stringent VSC performance requirements while achieving minimal communication latency or sustained multiple-hop throughput without requiring excessive bandwidth and significant protocol overhead.

BRIEF SUMMARY OF THE INVENTION

Accordingly, an object of the invention is to create appropriate communication boundaries for a moving device to moving-device communication by grouping a plurality of moving devices into a management group, such as a Local Peer Group ("LPG"), to coordinate and relay message transmission and to control the range and direction of the message propagation. Additionally, an object of the present invention is to provide a simple protocol for establishing and maintaining the Local Peer Groups, dynamically assigning an identification and periodically updating a relative order for the moving devices.

A method for organizing and maintaining an ad-hoc network for communication between a plurality of moving devices is disclosed. The method comprises the steps of grouping the plurality of moving devices into at least one local peer group (LPG), ordering the plurality of devices within each LPG based upon a relative position of each of the plurality of devices within each LPG and assigning a unique identifier for each of the plurality of moving devices, where the unique identifier is based, in part on the LPG in which the corresponding moving device is located.

There are two types of LPGs, a stationary LPG and a dynamic LPG. A location and size of a stationary LPG are predefined and programmed into memory of each moving device. A dynamic LPG is formed based upon a clustering of one or more of the plurality of moving devices. The network can include either the stationary LPG and/or the dynamic LPG.

Each LPG can be divided into equivalent cells (EC) defined by a group of moving devices that are within a one hop of each other such that only one transmission of a message is needed to reach any of the group of moving devices within the EC. Each EC is controlled by an equivalent cell header (ECH).

The relative position of a moving device is updated to account for reordering due to motion of the plurality of moving devices. The ordering or reordering can be accomplished by creating a position vector representing the relative position of each moving device within each LPG.

A position vector is generated by initializing the position vector, broadcasting the initialized position vector to another moving device that is joining the LPG, comparing, by the another moving device, its position with position information that is included in the broadcast, inserting a position value of the another moving device into the position vector based upon the comparison, and broadcasting an updated position vector to all other moving devices within the LPG.

Alternatively, the ordering and reordering of the moving devices can be accomplished by broadcasting a message including a first moving device's position, an indication of a intended message direction, and a time of the broadcast, receiving the broadcast message by a second moving device, estimating a displacement of the first moving device based upon the received broadcast message, calculating a current position for the first moving device based upon the estimated displacement and the first moving device's position, and comparing the calculated current position with a position of the second moving device. A second moving device will only relay or forward a message when the second moving device is determined to be along the intended message direction.

The unique identifier for each moving device is LPG specific. Therefore, the unique identifier is changed for a moving device when the moving device changes LPGs. Additionally, a moving device that is located near a border of two adjacent LPGs or within a overlapping area of the adjacent LPGs is assigned two IP addresses to allow for communication between the adjacent LPGs.

This unique identifier can be an IP address. The IP address can be assigned based upon a predefined network prefix concatenated with a unique LPG identification and a unique moving device identification. The unique LPG identification and the unique moving device identification can be calculated from a hash function. Alternatively, the unique LPG information and the unique moving device identification can be provided from an external wireless device in communication with the plurality of moving devices.

Each of the plurality of moving devices can be classified according to a type of moving device and the unique identifier can be assigned based upon this classification.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION OF THE INVENTION

In accordance with the invention, nodes or moving devices are organized into manageable groups. These groups are used to coordinate transmission of data between the nodes. The groups are built based upon the relative location of neighboring nodes or based upon a fixed location. This grouping or Local Peer Group ("LPG") is the basis for routing radio signals within a single LPG, as well as between LPGs. The radio signals include vehicle safety applications and information applications.

The purpose of the LPGs is to build degrees of coordination among neighboring nodes. These neighboring nodes are moving devices with wireless communications capabilities. A moving wireless device can be a PDA, laptop, cell phone, or a moving vehicle with a wireless device either attached or embedded. Specifically, moving devices include vehicles with associated communications devices, which are installed in the vehicles, or independently brought into the vehicles, as well as pedestrians with communication devices.

There are two types of degrees of coordination; a first type is a tight coordination of moving devices within an immediate vicinity, which is used for intra-LPG communication for near-instantaneous messaging. For example, sending an urgent road-obstacle warning or another type of emergency or safety message would be performed using the inter-LPG messaging. These messages typically require a 100 msec latency.

A second type is a loose coordination, grouping moving devices in a neighborhood. This type of coordination is used to support inter-LPG communication among linked or interconnected LPGs. For example, inter-LPG communication can be used for roadway awareness application and for extending a driver's view.

LPG not only can support efficient and reliable moving-device-to-moving-device communication, but also can support moving-device-to-fixed-infrastructure communication so that moving devices and roadway infrastructure can be integrated as a complete communications network.

Figure 1:
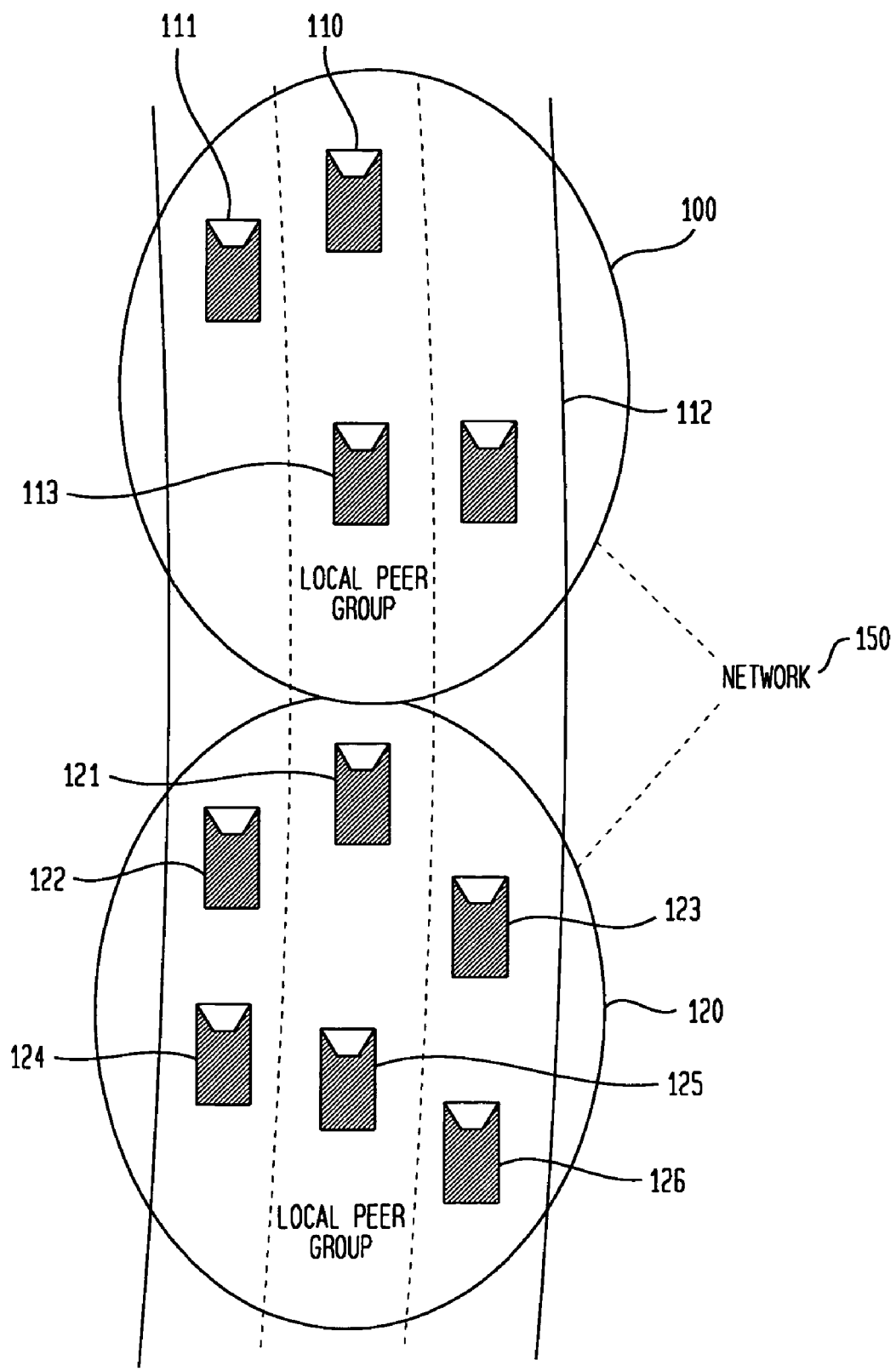
FIG. 1 illustrates an example of two local peer groups according to the invention.

FIG. 1 illustrates two LPGs, the first LPG 100 includes four nodes 110, 111, 112, 113, respectively. Each of these four nodes 110, 111, 112 and 113 can broadcast data to each other. The second LPG 120 includes nodes 121, 122, 123, 124, 125 and 126, respectively. Each of the nodes 121-126 can broadcast data to each other. This type of transmission is an intra-LPG transmission and occurs instantaneously. Nodes 110-113 in LPG 100 can broadcast data to nodes 121-126 in LPG 120 by using inter-LPG communication. The two LPGs, 100, 120 form the ad-hoc network 150.

There are two types of LPGs, stationary LPGs and dynamic LPGs. A stationary LPG uses pre-assigned group location definitions to partition moving devices. In contrast, a dynamic LPG coordinates moving devices based on the (dynamic) radio coverage of the neighboring moving devices for communication.

Figure 2:
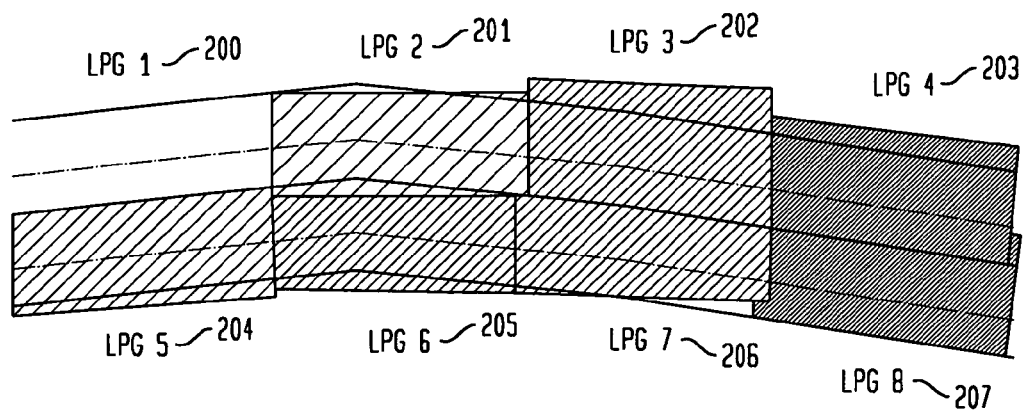
FIG. 2 illustrates a plurality of stationary LPGs according to the invention.

FIG. 2 illustrates a plurality of stationary LPGs (LPG 1-8) 200-207. Each LPG is defined by a specific location or area, i.e., if a wireless device or moving device is in area 1, the device is LPG 1. If a wireless device or moving device is in area 2, the device is LPG 2 and so on. The particular size of a stationary LPG is a design choice, depending on various factors, e.g., range of the radio antenna, communication range, number of moving devices, topology of the land, the environmental conditions, traffic patterns and population density. The location and size of the stationary LPG is fixed, however, each stationary LPG might be of a different size since traffic patterns and population (moving devices) density is different in different places. Typically, the LPG size should be larger than radio communication range to allow for multi-hop communication. Additionally, to facilitate efficient inter-LPG communication the stationary LPGs may also overlap the area between adjacent LPGs. The overlapped area can have a flexible size to adapt to variable situations, e.g. different moving devices speeds.

According to one embodiment of the invention, the boundaries for a stationary LPG is based upon a predefined area such as a zip code or an area code. Typically, a zip code accounts for a population density. The population density of an area is a good indicator of a traffic pattern or the number of moving devices within an area.

A stationary LPG based network architecture requires that the moving device is equipped with a Global Position System (GPS) or some other position information. This will allow the moving device to identify or detect the stationary LPG to which the moving device belongs. The moving devices will change stationary LPGs as the moving devices change their position. Therefore, there is a need for the moving device to periodically receive updated position data. This period will depend on the speed or velocity of the motion of the moving device. A moving device will include a database of LPGs and their locations.

Stationary LPGs have a significant advantage of supporting integration with wireless infrastructure to provide backbone access or inter-LPG communication even when some LPGs are empty or do not have many moving devices within the LPG.

Each stationary LPG is assigned a unique identifier to facilitate communication. In one embodiment of the invention, the unique identifier for the stationary LPG is assigned based upon the zip code of the LPG. This method takes advantage of an existing zip code database. Thus, there would be no need to create a new identification number. Alternatively, in another embodiment, the GPS coordinates of the stationary LPG can be used. Once again, the method would take advantage of a predefined database. In another embodiment, the state and city name can be used for the LPG's unique identifier. Alternatively, any combination of the above-identified embodiment can be used to assign an LPG unique identifier. The LPG's unique identifier is used as part of the moving device's unique identifier, as will be described later.

Since every stationary LPG area is well defined, formations and naming the LPG is easier than the dynamic LPG. Additionally, rules regarding merging and splitting an LPG are not a concern when using a stationary LPG.

Figure 3:
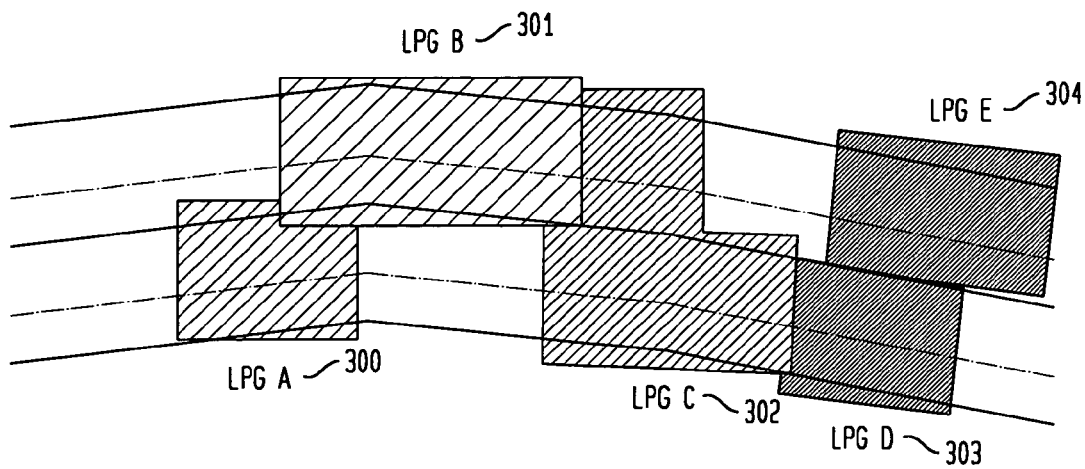
FIG. 3 illustrates a plurality of dynamic LPGs according to the invention.

FIG. 3 illustrates a plurality of dynamic LPGs (LPG A-E) 300-304, respectively. As opposed to a stationary LPG, a dynamic LPG is formed based upon the radio coverage of neighboring moving devices so that a moving device can coordinate communications without worrying about exact location of the moving device.

Since the dynamic LPG is formed based on radio coverage, moving devices, within the LPG, can always communicate with each other via single or multiple-hop transmission. The moving devices are able to control the size of the dynamic LPG, in order to keep the number of moving devices in each LPG reasonably small so that the communication can be performed efficiently with low latency. Additionally, in contrast with a stationary LPG, the dynamic LPG ensures that communication is always possible within each LPG.

In one embodiment, an ad-hoc peer-to-peer network can be created from one or more stationary LPG or one or more dynamic LPG. In another embodiment, the ad-hoc peer-to-peer network can be created from both stationary LPGs and dynamic LPGs as a hybrid LPG network. A Hybrid LPG network combines the benefits of the stationary LPG and dynamic LPG while removing the problems caused by each taken separately.

One of the benefits of a stationary LPG is the ability to easily group moving devices by area and to interact with infrastructure. Additionally, the stationary LPG allows for simple assignment of addressing or unique identifiers for each moving device, as will be discussed in detail later. Further, every node knows the whole network topology and structure. Therefore, a node or moving device can be easily tracked.

There are several advantages of a dynamic LPG. One of the advantages is that the dynamic does not need a priori configuration, since the network is formed based upon a clustering of nodes. Additionally, the dynamic LPG is also more flexible for LPG forming, merging and separation and once formed all vehicles can communicate at one time; therefore, communication between neighboring moving devices is easier.

A drawback of the stationary LPG is that it requires a more mature roadside wireless access points, roadside gateways, roadside data storage (for deposit and retrieval), in contrast with the dynamic LPG which needs none.

The hybrid approach would take advantage of the roadway topology. Specifically, when infrastructure is not available, a dynamic LPG is used to form the network. When infrastructure becomes available in some area, a stationary LPG can be used to form the network with dynamic LPGs and infrastructure.

For example, infrastructure, such as roadway infrastructure, would enable roadway-vehicle communication or roadway-assisted communication. This is particularly useful when using a stationary LPG. Additionally, the roadway infrastructure will facilitate Infrastructure-to-Vehicle communication. This type of communication is important to distribute certain emergency information, such as hidden driveway warning, electronic road signs, road surface conditions, railroad crossing warning, route guidance and navigation, highway merge assistance, intersection collision warning, and work zone warning.

There are two main categories of LPGs: LPGs without ordering and LPGs with relative ordering. In an LPG with relative ordering, at least some of the moving devices are aware of the relative location of neighboring moving devices. This relative ordering is the basis for routing of messages within the LPG. The sense or awareness of the relative ordering and relative direction of the neighboring moving devices will enable an efficient routing of messages in an LPG environment. This efficient routing is important when the message is an emergency message in a roadway environment. For example, a vehicle may designate a warning message as going to the back of the LPG. Vehicles ahead of the sending vehicle in the LPG do not need to receive or relay the message. Since the vehicle will know the relative direction, the vehicle can direct the message towards the proper direction thereby reducing the amount of relay traffic and bandwidth used.

The sense or awareness of a direction can be derived from a relative order of the moving devices. In one embodiment, the relative ordering occurs on an "on-demand" basis. In another embodiment, the relative ordering is maintained periodically.

Figure 4:
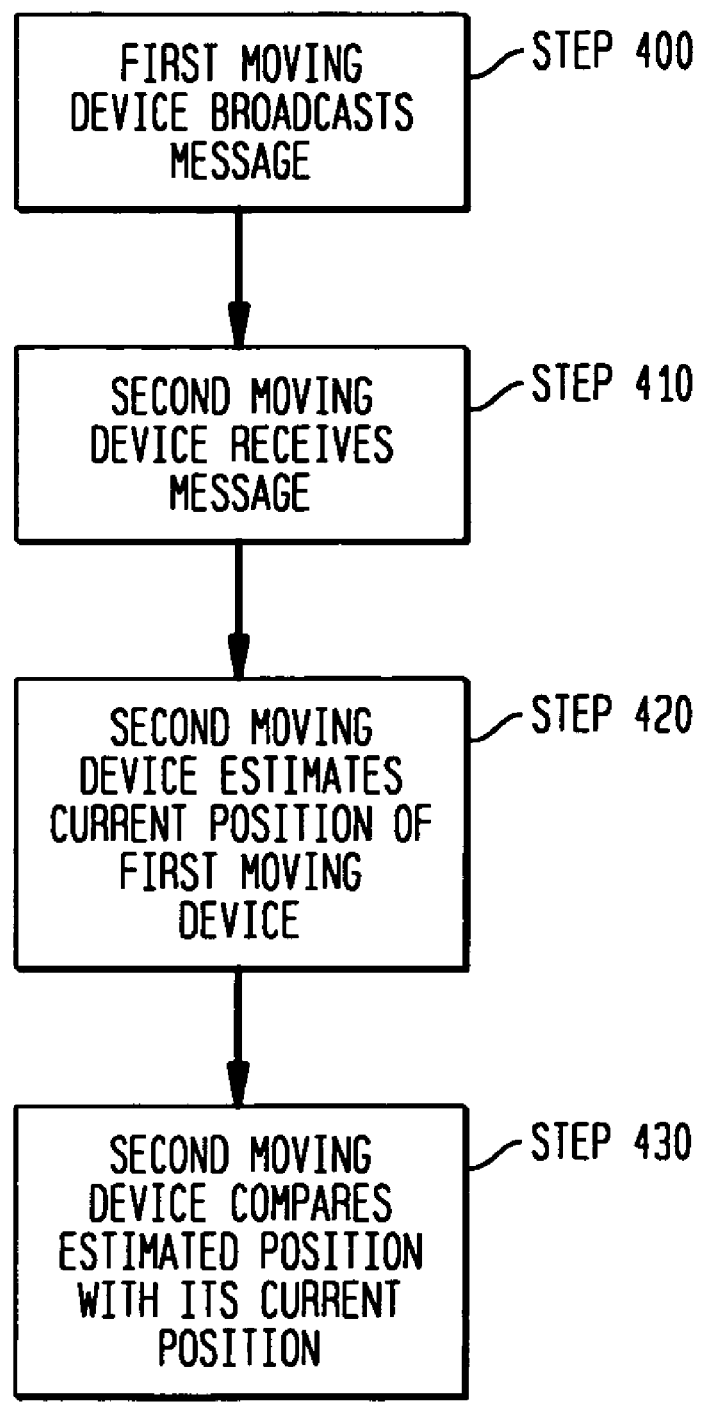
FIG. 4 illustrates the method of ordering a LPG on an "on-demand" basis according to an embodiment of the invention.

FIG. 4 illustrates the method of ordering an LPG on an "on-demand" basis, according to one embodiment of the invention. The process begins at step 400. A first moving device broadcasts a message that includes the moving device's GPS position, its current velocity and timestamp along with an intended message direction. At step 410, a second moving device receives this message. The second moving device will estimate a current position for the first moving device, at step 420. This is accomplished by estimating the first moving device's current position based upon the first moving device's likely displacement from its previous position, which is known. The previous position is taken directly from the received message. The likely displacement is calculated based upon an estimated velocity and time difference. Since the received message includes a timestamp, the second moving device calculates the difference in time, i.e., from the timestamp to the time that the message was received. This would require that the moving devices have a synchronization in time for both the clocks and GPS information, i.e., GPS devices are synchronized. The estimated velocity can be calculated in several different manners. In one embodiment, the (instantaneous) velocity of the first moving-device is included in the message sent by the first moving-device. This velocity can be used by the second moving device as the estimate of the first moving-device's current velocity. In another embodiment, the second moving device can use its own velocity as the velocity for the first moving device. Alternatively, a predetermined estimated velocity can be used. The predetermined estimated velocity will be pre-stored in the moving device's memory in a database that can vary based upon the speed limit, time of day, location, weather conditions, and topology. The second moving device will multiply the estimated velocity with the difference in time to obtain the likely displacement. This value is the likely displacement from the previous position and is used to adjust the first moving device's previous position to obtain the estimated position of the first moving device.

In one embodiment of the invention, the displacement of the first moving-device has an orientation component. In this embodiment, the estimated displacement accounts for a change in orientation. The change in distance will be added to the previous location in the direction of the traveling of the first moving-device. In one embodiment, the first moving-device may include its GPS orientation (e.g., NW, SE35°) in its message (along with its position, timestamp, etc.), and this orientation information is used by the second moving-device to estimate the exact displacement. Alternatively, in another embodiment, the second moving-device may estimate the orientation of the first moving-device (without the first moving-device sending any orientation information) by taking advantage of the local topology information, i.e., both moving-devices may be traveling along the same roadway. Therefore, the second moving-device can add the calculated displacement to the previous position (of the first moving-device) in the direction that the second moving-device is moving.

At step 430, the second moving device will compare the calculated estimated position of the first moving device with its current position to determine the relative ordering of the two moving devices.

The second moving device will only relay or forward the message when the second moving device is determined to be along the intended message direction. A moving device is along the intended message direction if its position and orientation is between a sending moving device and the receiving moving device. Specifically, the second moving device will use the calculated relative order or position to determine if the second moving device is along the intended path.

In one embodiment, the orientation information is used to determine if the second moving device is along the intended path. This orientation information is used by the second moving device to derive the estimated position of the first moving device as described above. Once the relative ordering between the two moving devices is determined as described above, the second moving device can determine if it is on the path of first moving-device's intended message transmission by using the orientation of the first moving device, that is included in the message from the first moving device and its own orientation. For example, when both moving devices have similar orientation (i.e., traveling along the same roadway) and the second moving device is ahead of the first moving device (determined by their relative ordering), the second moving device will forward the message (of the first moving device) if the intended message direction is along the same orientation, whereas the second moving device will not forward the message if the intended message direction is of the opposite orientation. In another embodiment, where the first moving device does not send its orientation information in the message, the second moving device may estimate the orientation of the first moving device, as described above, e.g., estimation of displacement to the previous position. Once the orientation and the relative ordering of the two moving devices are known, the second moving device can determine if it is along the path of the first device's intended message transmission in an analogous manner, as described above.

If the second moving device is not in the path, the message will not be forward. Ordering the moving devices, according to this embodiment, has an advantage that the bandwidth is not flooded with ordering requests when the ordering of the moving devices is not important.

Figure 5:
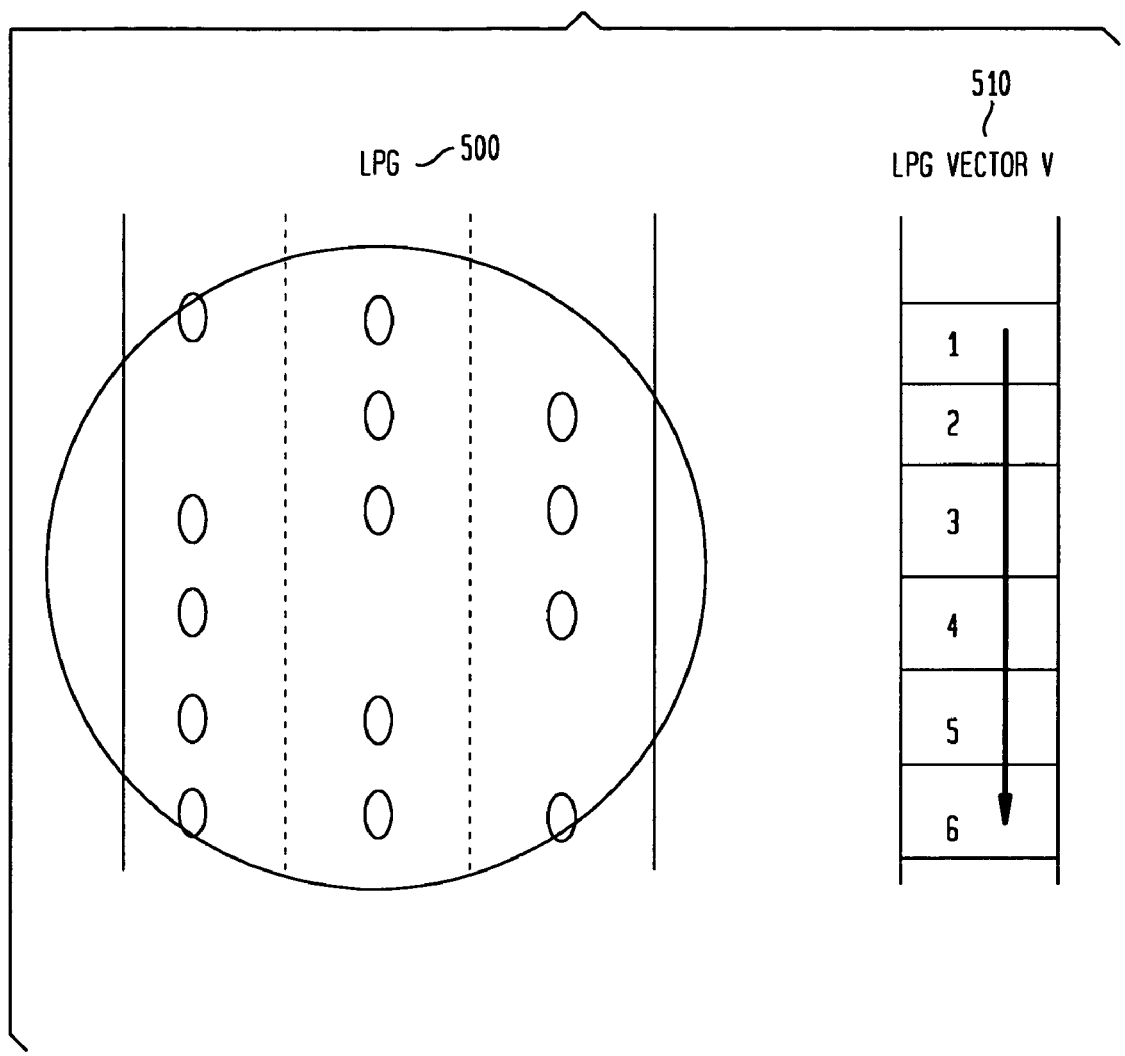
FIG. 5 illustrates an example of ordering the moving device according to another embodiment of the invention.

In another embodiment of the invention, the relative order of the moving devices is periodically updated using a position vector. FIG. 5 illustrates an example of ordering an LPG using this method. FIG. 5 depicts an LPG 500 with an LPG position vector V 510. The LPG is mapped into a one-dimensional array or vector V 510. Each moving device of the LPG 500 will have a vector ID, which is just its position index of V. As depicted in FIG. 5, the vector V 510 represents a position order of the moving devices. In FIG. 5 there are six different relative orders 1-6. The arrow illustrates the direction of the motion for the moving devices, e.g., traffic flow.

The position vector V 510 allows a moving device to control the direction of information transmission. In particular, information can be routed in the peer group using the position vector V 510. For example, if a sending moving device with index 3 as depicted in FIG. 5, indicates that its message is meant for moving devices with indices that are smaller than 3, only the moving devices that have index j<3 will relay the message. This will be accomplished by indicating that the message is meant for vehicles with indices smaller than j. The relaying will continue until the message reaches the backend boundary node of the LPG or the message has reached the maximum number of hops. Information propagation in the forward direction can be achieved in an analogous fashion.

Additionally, by using the position vector V 510 a routing priority can also be facilitated. The MAC layer can develop an access priority based upon this position vector 510. In general, in the network, a higher access priority will be given to moving devices with lower position indices (the ones at the front part of the LPG) since moving devices in front are more likely to observe warning events and deserve to use the wireless channel at higher priority.

Figure 6:
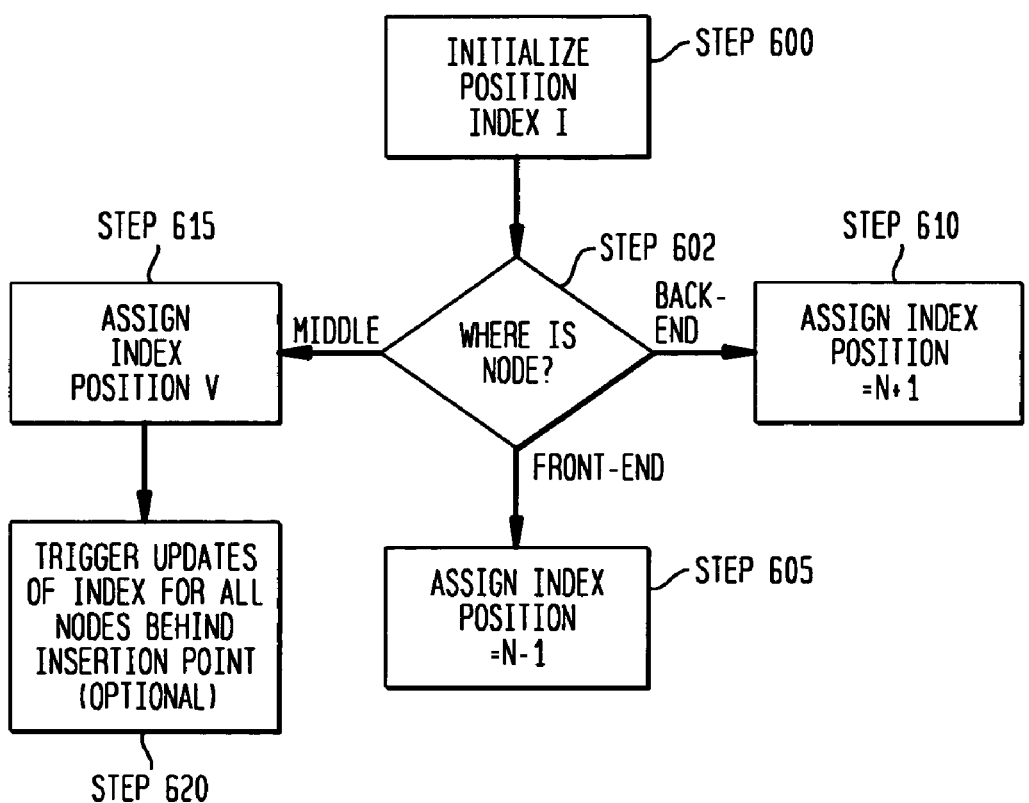
FIG. 6 illustrates a method for ordering the moving devices according to an another embodiment of the invention.

FIG. 6 illustrates a method of creating the position vector V 510 according to an embodiment of the invention. The process begins at step 600 by initializing the position index I when a moving device, for example node N, joins an LPG. Node N makes contact with at least one other moving device already in the LPG, for example, node L, by receiving a message from the other moving devices. Node N learns of the position of node L based upon the received message that includes node L's GPS position, step 602. Node N compares the received position information with its own GPS position and inserts itself into the vector V 510 based upon the comparison. Node N then transmits the new position vector V 510 to the other moving devices within the LPG, e.g., to node L. For example, if node N is ahead of node L, and node L was the front-end position with an index of N, then node N assigns itself a value of N−1 as its position index and becomes the new front-end of the LPG, at step 605. On the other hand, if node N is behind node L and L is the back-end position with an index of n, node N will assign itself a value of N+1 as its position index and takes over as the back end position, at step 610.

If the moving device, e.g., node L, with index of n is neither the front-end or back-end, node N is joining in the middle of the LPG. Node N will then insert itself into the position V by comparing the GPS with node L, step 615, as set forth above and then trigger any of the indices of all of the moving devices behind the insertion point, at step 620. The other nodes behind the insertion point will then update their position index based upon the change in their GPS position.

Alternatively, instead of automatically triggering the update of the other moving devices upon insertion of the new node or moving device, the new moving device is assigned the index n+1, and all moving devices with indices larger than n will increment their indices by 1.

Another alternative to automatically updating or incrementing the position vector V 510 is to increment the other moving devices within a predetermined position interval. This would reduce the frequency of index updates. A node N joining in the middle is assigned an index taken from an interval of values, between n and n+K, without the need to increment the indices of moving devices with positions higher than n+K. Only moving devices within this interval (n and n+k) would need to update their position index.

Additionally, the position vector V 510 can be updated to maintain the relative order of moving devices within the LPG, i.e., once the moving device has joined the LPG. Each moving device can update its position index periodically. The position index (i) of moving devices inside the LPG may be maintained, so that the position vector V 510 includes the current relative positions of the moving devices in the LPG. In particular, the position index can be updated when moving devices change relative positions caused by moving devices passing each other. The position index of the moving devices is swapped when two moving devices swap their relative positions. For example, at a periodic interval, moving devices exchange or broadcast its GPS position and swap position indices if their relative positions have swapped. The period can be adjusted based upon the type of network, topology, time of day, traffic pattern and type of message, or location of the LPG, e.g., more frequent updates around an exit/on ramps or intersections, and less frequent updates when the moving devices are between the exit/on ramps or intersections. The overhead to maintain ordering consistency can be reduced by increasing the update interval.

However, the exchange of GPS or position information has its drawbacks particularly in a roadway environment. Specifically, the number of moving devices in an LPG might cause heavy amount of GPS coordinates being communicated constantly (trying to keep up the change in relative positions). Additionally, there is a potential that the error of the GPS coordinates may be on the same order of the moving devices separation distance, so the resulting position calculations may not be accurate enough. Additionally, the above method requires a significant amount of the calculation and, in general, the GPS information is outdated when other moving devices receive them.

In another embodiment, the relative order of the moving device can be determined by using messages and position vectors, without using GPS information. As stated above, maintaining the ordering using a GPS approach may incur a significant overhead, especially where the number of moving devices is large. In this embodiment, an LPG is divided into several smaller groups or equivalent cells (EC). Each EC is assigned one position index. An EC is a group of neighboring moving devices that are within the same radio coverage. An EC is a segment of the LPG that has the same vector index for all of the moving devices within the EC and a single message transmission can be received by all of the moving devices within the EC.

Figure 7:
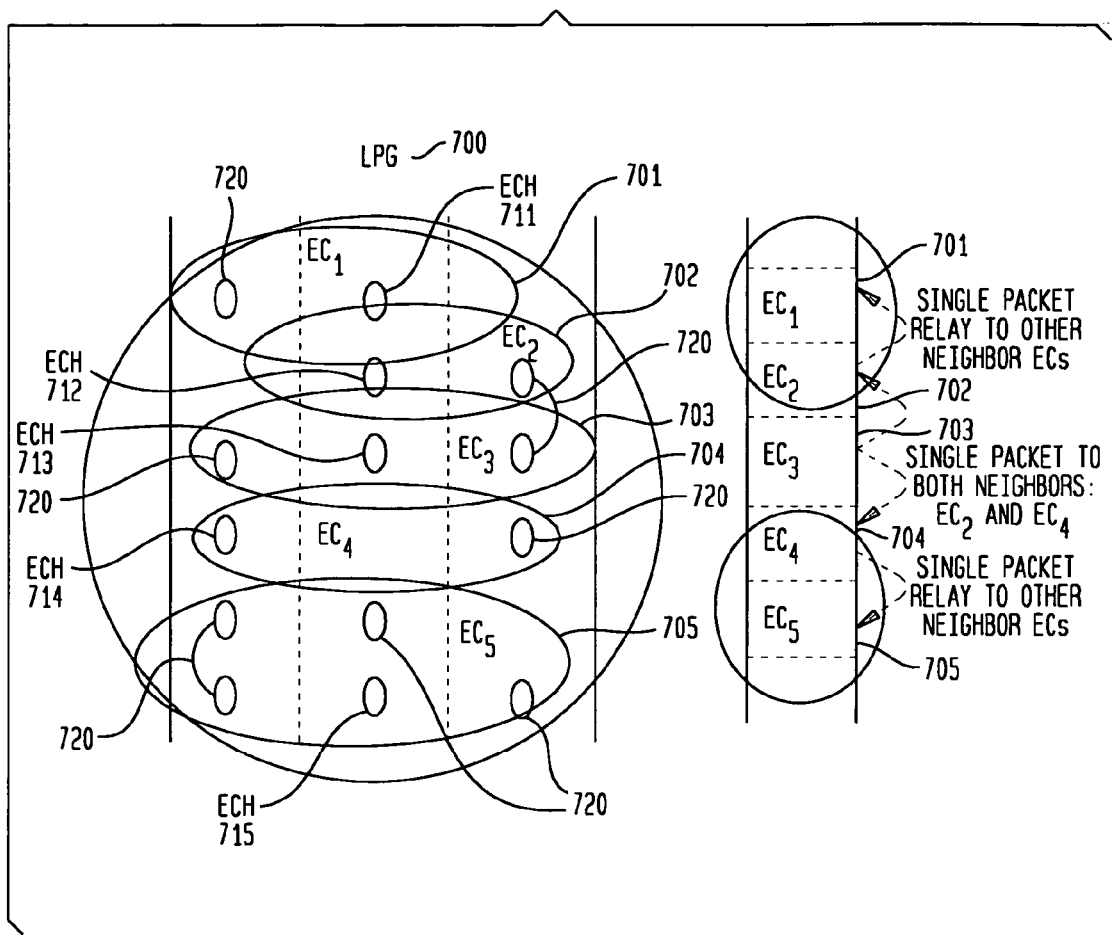
FIG. 7 illustrates a plurality of ECs within an LPG.

The EC is formed to link with other ECs to disseminate information using the ECs as the basic units. FIG. 7 illustrates a plurality of ECs (EC1-5) 701-705 within a LPG 700. The ECs 701-705 can be arranged within the LPG 700 to overlap radio coverage. In the network depicted in FIG. 7, the relative ordering of the LPG is maintained among ECs, to reduce the overhead. Additionally, a message is relayed once per EC, to improve bandwidth efficiency.

For example, moving devices within an EC can be reached with a single packet transmission. Each EC is organized such that some moving devices in the EC can relay a packet, if needed. The ECs can be ordered within the LPG, so that messages can hop along the ECs. Specifically, if a moving device in EC3 703 wants to send a packet, that moving device can transmit the packet (once) to the neighboring EC2 702 and EC4 704, which ensures that all moving devices in EC2 702 and EC4 704 are reached. This packet may be relayed by EC2 702 and EC4 704 onto their respective neighbors, one packet per EC. This type of neighborhood-to-neighborhood routing, one packet per neighborhood, can minimize packet transmissions within LPG.

An EC is maintained and controlled by one equivalent cell header (ECH). Each ECH 711-715 is linked with its neighboring ECHs so that all ECHs 711-715 in an LPG, whether directly or indirectly, are serially linked. The ECHs 711-715 are connected in order of radio hop counts and represent the forwarding nodes for the LPG. Only ECHs 711-715 are responsible for relaying messages, which minimizes unnecessary traffic.

In this embodiment, the ECHs order themselves and maintain their order to accomplish the ordering for the LPG. Each ECH announces its presence in the LPG by broadcasting a predefined message. This message is broadcast periodically and advertises a list of linked ECHs, i.e., comprises one-hop, two-hop, three-hop in a position order relative to the broadcaster's perspective. The list is received by other ECHs, which cause the other ECHs to update their list and store the list in memory. Non-ECHs 720 also update their list. This allows that all ECHs lists are consistent with each other. The list represents the relative order for each ECH. This facilitates a determination of the direction of motion and direction of the transmission.

In one embodiment, the broadcast message contains an ID of the source originating the message, a first list of ECH nodes that are visible to the source along a first communication path of the orderly connected ECs, and optionally a second list for a second communication path of the orderly connected ECs. Additional lists may be provided, wherein each Linked ECH (LECH) list contains ECH IDs for all ECH nodes encountered along one branch, or communication path, of the orderly connected ECs, with the source ECH as the epicenter.

For example, each ECH knows the relative position of its direct neighboring ECHs, i.e., the ECH for EC 3 703 knows that the ECH for EC 2 702 and EC 4 704 are in a different direction based upon the list or vector broadcast by the ECH for EC 2 702 and EC 4 704, respectively. The ECH for EC 3 703 will broadcast its message containing this information. Further, the ECH for EC 2 702 knows that the ECH for EC 1 701 and EC 3 703 are in a different direction based upon the list or vector broadcast by the ECH for EC 1 702 and EC 3 703, respectively. This information will be combined and stored as one list that each ECH maintains.

Accordingly, by using the relative order for the ECHs, the message can be routed in the proper direction without any GPS information.

Alternately, in another embodiment, all moving devices are equipped with directional antenna in key directions (e.g., front, back, left, and right, plus possible diagonals) and are able to sense the presence of other moving devices in these directions. Any moving device can indicate a message as going toward the back of the peer group, sends a message only on its back-pointing directional antenna, and moving devices receiving this message may relay only on their back-pointing antenna. This approach provides the basic direction sense, but does not provide relative positions among moving devices.

Figure 8:
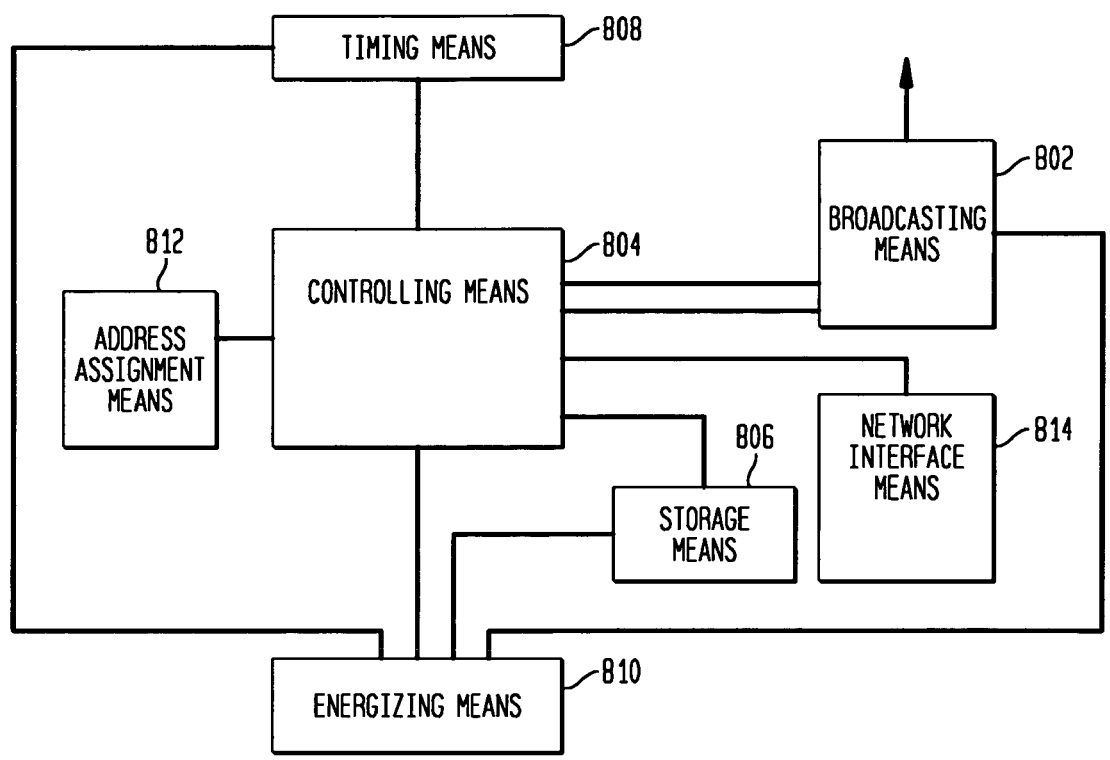
FIG. 8 depicts a wireless device that is attached or embedded in a moving device according to the invention.

The moving device according to the invention includes a wireless device that is attached to, embedded in or used in combination with the moving device. FIG. 8 depicts a wireless device according to the invention. The wireless device according to the invention includes a computing device 800 having a broadcasting means 802, such as a wireless transceiver, for providing wireless communication between nodes in a radio coverage range. Additionally, a controlling means 804, e.g., microcontroller, microprocessor, etc., is configured for receiving signals from other nodes through the broadcasting means 802 and transmitting signals to other nodes through the broadcasting means 802. The controlling means 804 also provides operational control by executing the instructions. A storage means 806 is disposed within the computing device 800 and in operational communication with the controlling means 804. The storage means 806 may be memory modules, removable media, a combination of multiple storage devices, etc., and is dimensioned to store the processor-executable instructions necessary for the performance of the protocols of the described embodiments. Further, a timing means 808 is provided either as a separate component or via a function of the controlling means 804. The timing means 808 provides the time interval tracking necessary for each of the timers referred to in the described embodiments. An energizing means 810, such as a power supply, is electrically connected to all the components of the computing device 800 for providing operational power to the components as necessary. The wireless device further includes an internal clock that maintains a clock for the wireless device and is used as the timestamp for all messages. Additionally, the wireless device includes an address assignment means 812 and a network interface means 814. Alternatively, the address assignment means 812 can be part of the controlling means 804.

The processor-executable instructions for performing the described embodiments may be embedded in the storage means 806 in a form such as an EPROM, Flash memory or other such non-volatile storage. Additionally, the processor-executable instructions may be stored on a computer readable media such as an optical or magnetic medium, or may be downloadable over a network (e.g., Internet). Preferably, a user, as necessary, can periodically update the processor-executable instructions in order to provide additional enhancements to the system as they become available.

Each moving device will be assigned a unique identifier to facilitate the transmission and reception of messages over the ad-hoc network. The unique identifier can be any number that is uniquely assigned to the moving devices so that no moving device within an LPG is assigned the same unique identifier. This identifier must be assigned quickly to support immediate communication, if necessary. As stated above, the unique identifier can be any unique number or address that facilitates communication, such as a MAC address, VIN number, or IP address; however, for purposes of an example, assignment of an IP address will be discussed. Typically, a moving device will have at least one IP address. However, in one embodiment, two IP addresses will be assigned to the moving device, to support both intra-LPG communication and inter-LPG communications.

In the preferred embodiment, the IP address will be based upon a special network prefix, the LPG unique identifier and a moving device's identification. Specifically, an IP address can be assigned based upon a predefined network prefix concatenated with a unique number that corresponds to a specific moving device, where the unique number is based upon the LPG that the moving device is in and a number corresponding to the moving device.

While similar assignment techniques for assigning addresses for both a stationary LPG and a dynamic LPG can be used, the assignment of addresses will be described separately for each type of LPG.

For a stationary LPG, in one embodiment of the invention, the IP address can be a standard network prefix and LPG ID concatenated with a hash value of the MAC address and VIN number or a time. The usage of a hash function is particularly important when there is a limitation on the address space, i.e., IPv4. According to this embodiment, the moving device will assign its own IP address.

In an ideal situation, the LPG will only have N moving devices, where N is the maximum address space, as the limitation in address space would be rendered moot. This will allow for a simple assignment of a private class for each LPG. Each moving device within the LPG will have a different lower portion of the IP address. This IP address can be reused in different LPGs as long as they are not near each other.

However, typically a LPG might be larger than N moving devices. Accordingly, a predefined hash function will be stored in the memory section of the moving device. The address assignment means 812 will access this predefined hash function from memory to assign the lower portion of the IP address. The hash function will translate a plurality of input numbers into an M-bit number, where M is the maximum number of bits in the lower portion of the IP address. The plurality of input numbers can include the VIN number, MAC address and the time that the moving device joined the LPG.

The standard network prefix is the upper portion of the IP address. The standard network prefix is also stored in memory. Furthermore, the IP address is LPG specific. A portion of the IP address will be used to identify the specific LPG where the moving device is located. A database of LPG locations and associated LPG ID is also stored in memory. When a moving device enters a new LPG area, the moving device will have to change its IP address to reflect the specific IP address that is associated with the LPG. An advantage of a stationary LPG is that the LPG locations are fixed and well defined. This allows for the naming of the LPG ID to be simple.

Alternatively, in another embodiment of the invention, a portion of the IP address or the entire address can be assigned by a stationary wireless device within the LPG. For example, a portion of the IP address can represent a sequence or order that the moving device entered the LPG. This would require an external wireless device transmitting a sequence number to the entering moving device. A connection can be established through a type of query-relay-reply operation. When a new moving device enters an LPG, it will make a query (through broadcast). The query is relayed by other moving devices in the LPG to a predetermined external wireless device. The external wireless device can include a roadside gateway device, another moving device such as a leader, or the first moving device within the LPG. The external wireless device will act as a DHCP server.

The external wireless device will generate a sequence number or IP address and respond to the query by sending a reply. This sequence number will be used as the lower portion of the IP address instead of the hash value. The sequence number will be concatenated with the upper portion of the IP address, as set forth above. Using this method, there is a potential that the IP address will continuously change as the sequence changed as a result of the constant motion of the moving devices. Alternatively, the entire address can be transmitted to a moving device that enters the LPG.

In another embodiment of the invention, if the IP protocol supports a wide range of IP addresses, the IP address can be the standard network identifier concatenated with the entire MAC address or VIN number. For example, using the IPv6 protocol, there is a significant amount of space to assign a unique address for each moving device without a need for a hash function. The upper 64 bits of the IP address can be dedicated to the LPG ID and the lower EUI 64 bits can be calculated directly from the MAC address or VIN number.

The upper portion of the IP address can include the standard network prefix and the unique LPG ID. The lower EUI portion will include each of the MAC address or VIN number.

Figure 9:
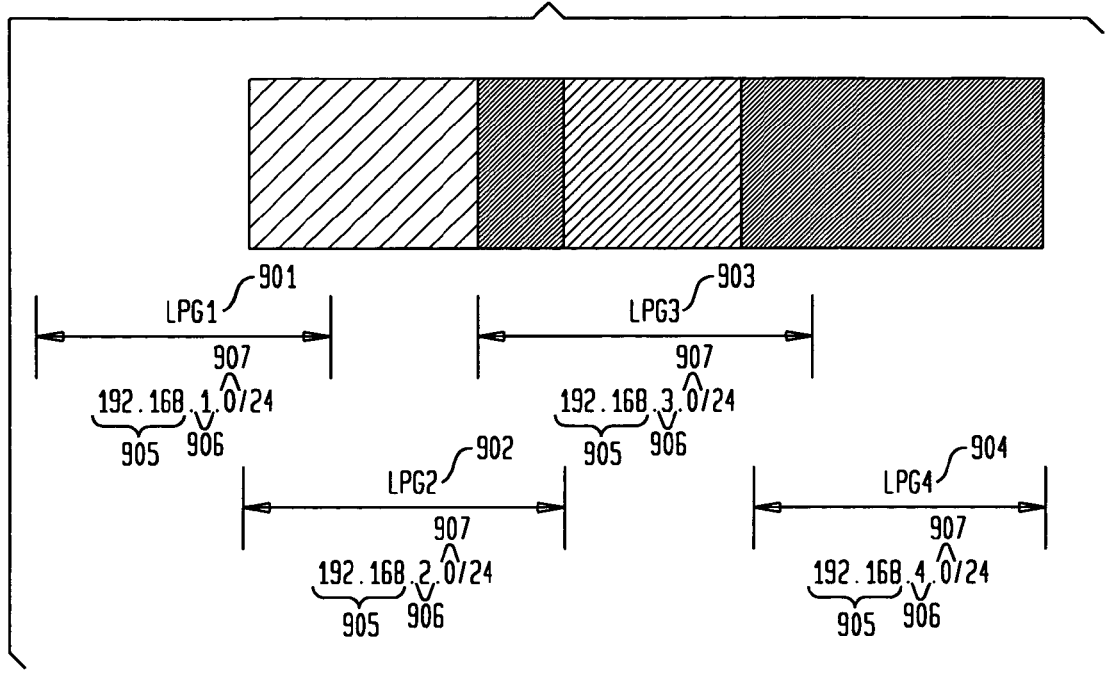
FIG. 9 illustrates an example of assigning an IP address according to the above-identified embodiments.

FIG. 9 illustrates an example of assigning an IP address according to IPv4 protocol. FIG. 9 depicts four overlapping LPGs, LPG1 901, LPG2 902, LPG3 903, and LPG4 904. The first two triplets 905 in the IP address represent that standard network prefix "192.168". The standard network prefix "192.168" is the same for all LPGs within the network. The third triplet 906 is the LPG ID and is LPG specific. As illustrated in FIG. 9, LPG1 901, LPG2 902, LPG3 903, and LPG4 904 have a value of 1, 2, 3, 4 in the third triplet 906, respectively. The fourth triplet 907 represents the individual moving device's identification. This number will vary based upon the moving device. This number can be assigned using any one of the embodiments described above.

Figure 10:
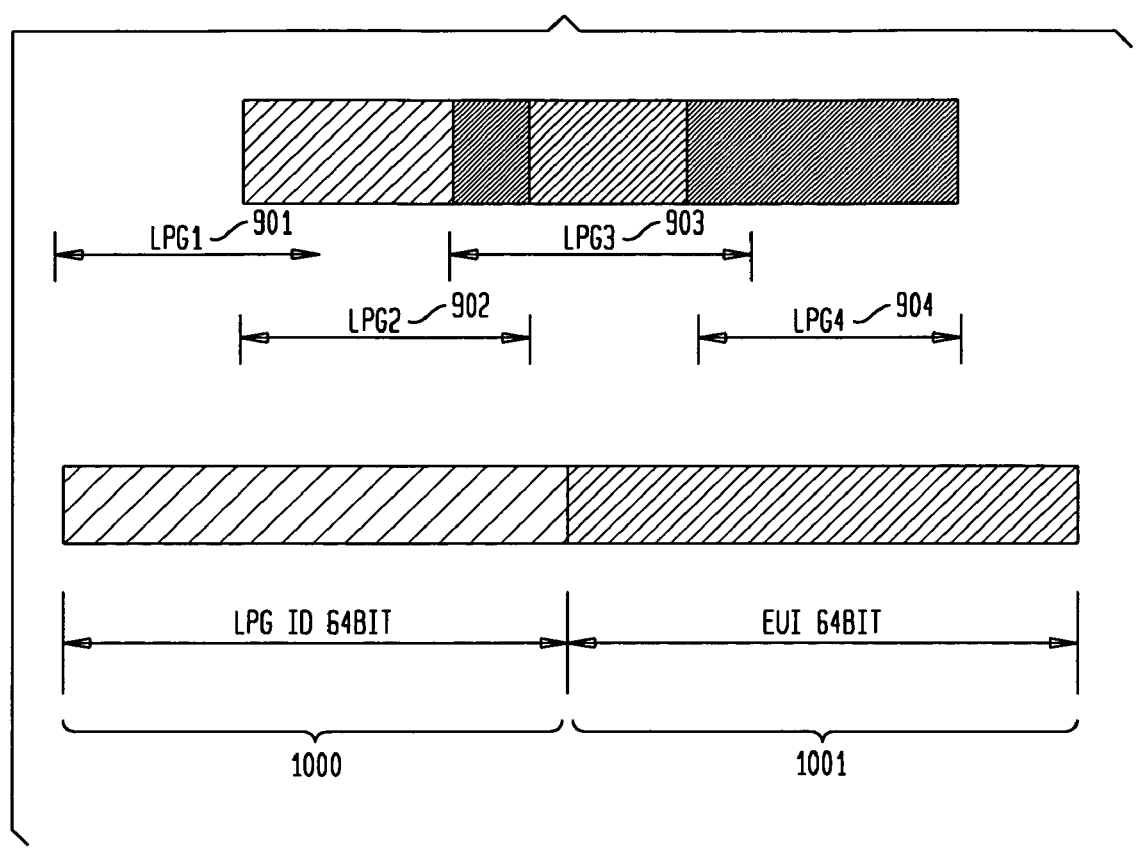
FIG. 10 illustrates the format for an IP address according to another embodiment of the invention.

FIG. 10 illustrates an exemplary format for an IP address for the IPV6 protocol. For illustrative purposes the same LPG reference numbers will be used for FIG. 10 as was used for FIG. 9. The upper portion 1000 is depicted to be 64 bits and represents the LPG ID and the lower portion 1001 is also 64 bits and represents the moving device's identification (EUI). Both the upper and lower portions 1000 and 1001 are different for each stationary LPG.

Additionally, as stated above, there might be some overlapping area between stationary LPGs to let moving devices change their LPG smoothly and to support easy inter-LPG communication. In the preferred embodiment, in overlapped areas, each moving device will have two IP addresses to allow for access to both LPGs. As a moving device approaches the overlapping area, the address assignment means 812 will assign a second IP address to the moving device. Specifically, the moving device will compare the position of the overlapping area, which is stored in memory, with its current position to determine if the moving device is located with the overlapping or boundary area. A wireless device has a network interface means 814 (i.e., 802.11 card). Many logical interfaces can be supported by the physical wireless interface. Each logical interface has one IP address. Each network interface means 814, therefore, can have more than one IP address. Each IP address can be assigned according any of the above-identified embodiments.

While similar techniques for assigning IP addresses for a stationary LPG can be utilized, assigning IP addresses for a dynamic LPG is more dynamic in nature. This is because the LPG's location is no longer fixed. Additionally, the LPG ID is not fixed and changes continuously. Furthermore, the assignment of an IP address to inter-LPG communication is different for a dynamic LPG.

Figure 11A:
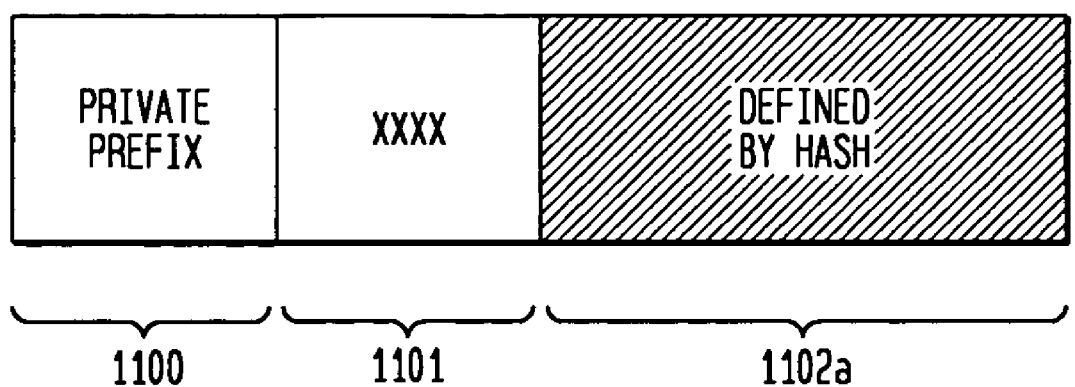
FIGS. 11a and 11b illustrate two different IP address formats used in the assignment of an IP address for a moving device in a dynamic LPG.
Figure 11B:
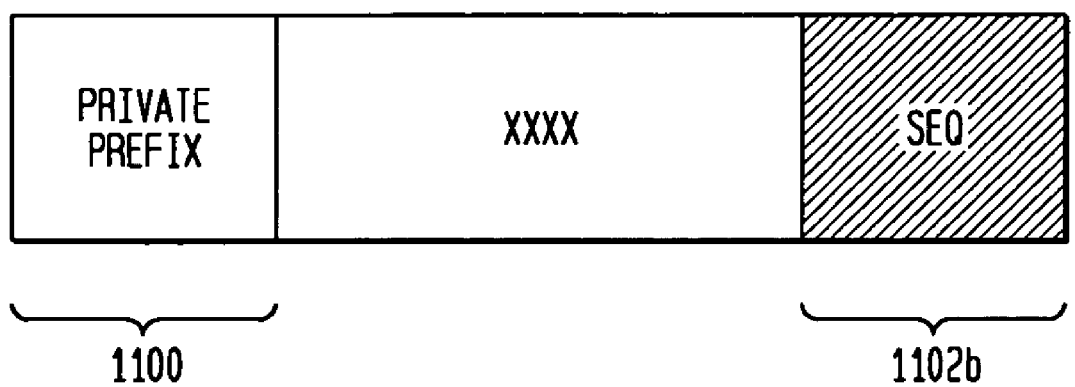

For intra-LPG IP address assignment for a dynamic LPG, the techniques are fairly similar to those used for assigning an IP address for a stationary LPG for the IPv4. FIGS. 11*a* and 11*b* illustrate two different examples of IP address formats for the IPv4 protocol. In both formats, the upper portion, i.e., first two triplets 1100 of the IP address is determined by a standard network prefix, e.g., 192.168, 10.0. and 172.12. In one embodiment, the standard network prefixes will be private addresses. The standard network prefix will be the first two sets of triplets of the address.

The third triplet 1101 is the LPG ID. In one embodiment, the LPG ID is randomly generated. The fourth triplet is the moving devices identification. This identification number can be assigned based upon either a hash function of the VIN or MAC address 1102*a*, as illustrated in FIG. 11*a* or a sequence that the moving device entered the LPG 1102*b*, as illustrated in FIG. 11*b*. The hash function and sequencing has been described above regarding the stationary IP address assignment and will not be described further.

This IP address will allow for communication within the LPG, i.e., intra-LPG; however, a separate IP address must be assigned to the moving devices for inter-LPG communication. This will be a public IP address. This public IP address can be assigned by an external wireless device, acting as a DHCP server or another moving device acting as the DHCP. This address assignment follows the DHCP protocol between a moving-device (which acts as the representative of the LPG) and the external device (which acts as the DHCP server).

Figure 12A:
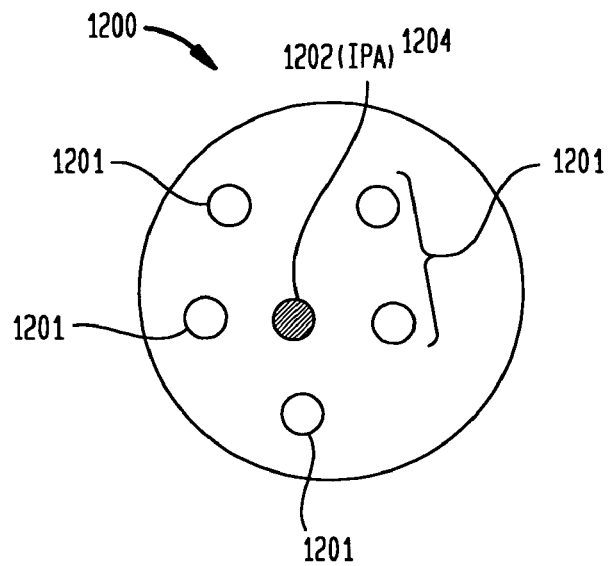
FIGS. 12a, 12b and 12c depicts three different embodiments for assigning a IP address for inter LPG communication according to the invention.

In one embodiment of the invention, one moving device within the LPG is assigned a public IP address for inter-LPG communication using the IPv4 protocol. As depicted in FIG. 12*a*, one node 1202 is assigned a public IP address IPA 1204. This node 1202 can be the first moving device within the LPG, a moving device that is selected to be a leader, or based upon another predefined selection criterion. Alternatively, the selection can be random. The remaining nodes 1201 will not have a public IP address IPA 1204 assigned.

Figure 12B:
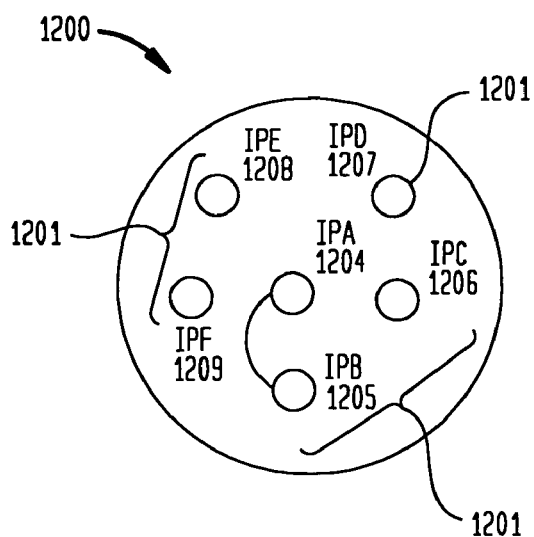

In another embodiment, each moving device within a given LPG will be assigned a different IP address. As depicted in FIG. 12*b*, the LPG 1200 has six nodes 1201. Each node 1201 will be assigned a different IP address IPA-IPF 1204-1209.

Figure 12C:
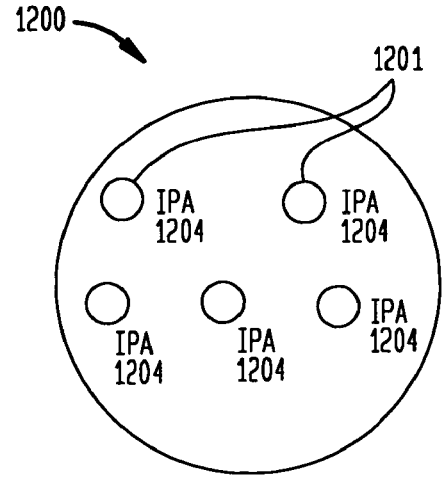

In a third embodiment, only one global public IP address is assigned for all moving devices in an LPG. As depicted in FIG. 12*c*, each moving device or node 1201 within LPG 1200 is assigned the same public IP address 1204. This public IP address 1204 is globally recognizable by others for communication over the Internet. For example, a public IP address could be 239.5.5.5

For the IPv6 protocol, there are two different methods for assigning an IP address for intra-LPG communication. Wireless devices, using the IPv6 protocol, are capable of two auto configuration functions: link local address and router advertisement address.

Figure 13A:
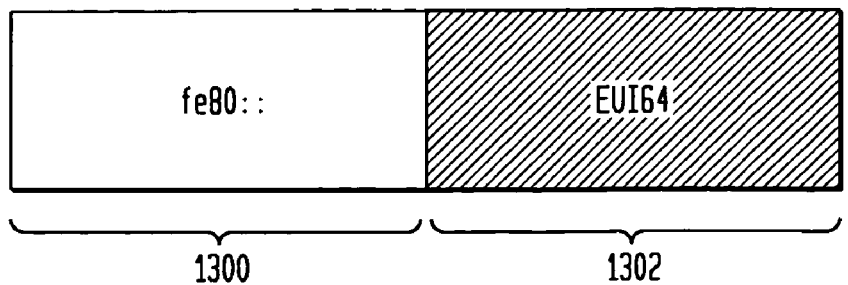
FIGS. 13a and 13b illustrate two different formats for the IP address for intra-LPG communication for a dynamic LPG.
Figure 13B:
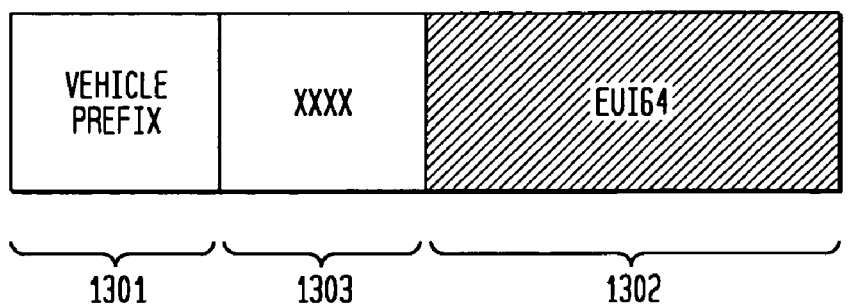
Figure 14A:
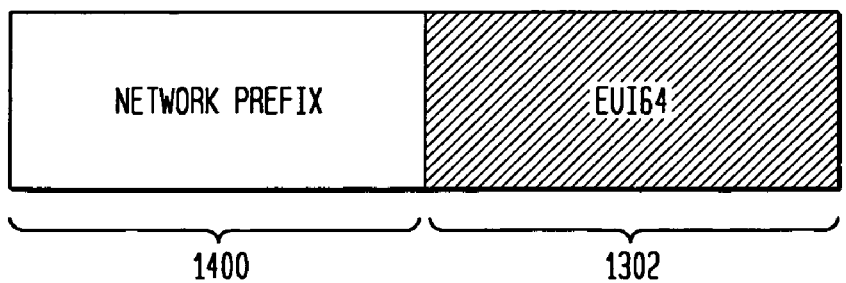
FIGS. 14a and 14b illustrate two different formats for the IP address for inter-LPG communication for a dynamic LPG.
Figure 14B:
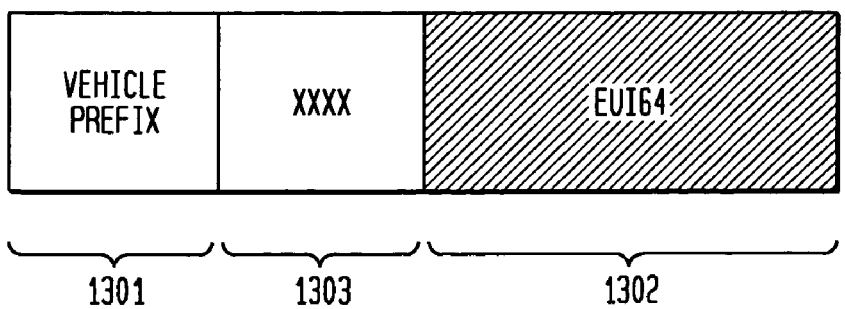

FIGS. 13*a* and 13*b* illustrate the two different examples of formats for the IP address for intra-LPG communication. As depicted in FIG. 13*a*, the first approach uses a link local address 1300, e.g., fe80. The link local address 1300 will be the upper portion of the IP address. The lower portion, the EUI 1302, which is 64 bits is calculated from the MAC address and/or VIN number. However, the link local address approach is only valid within the LPG and requires a second additional address for inter-LPG communication.

The second approach is to use site local-like approach or the router advertisement address as depicted in FIG. 13*b*. The network will include a predefined moving device prefix 1301 dedicated for a moving device network or vehicle network. This moving device prefix 1301 will be combined with an LPG ID to be the upper 64 bits, as represented in FIG. 13*a* as "XXXX" 1303. The lower 64 bits, the EUI64 1302, will be the same as in FIG. 13*a*. Therefore, the EUI64 number will be the same for both formats, and the difference is the upper portion of the ID address.

In both formats the LPG ID is used for a potion of the address. LPG ID must be unique for each LPG. According to an embodiment of the invention, the LPG ID can either be a randomly assigned number or predefined by a hash function. The hash function can account for the location of the LPG, if available, the MAC address of the first moving device within the LPG or the VIN number of the first moving device within the LPG.

For Inter-LPG address assignment, in one embodiment, an external wireless device is used to assign a portion of the IP address. The external wireless device can be any device such as a roadside gateway or a boundary router broadcasting its address range and prefix to LPGs. The network prefix can be obtained from those gateways' (routers) advertisement. The received network prefix 1400 will be used for the upper portion of the IP address, e.g. a global directory for the IP address. The lower portion of the IP address can be the same EUI64 1302 number as used for the intra-LPG communication IP address.

In another embodiment, a predefined vehicle or moving device prefix 1301 will be created and installed in the memory section of each moving device. This moving device prefix 1301 will be combined with a LPG ID 1303 to be the upper 64 bits. LPG ID must be unique for each LPG. According to an embodiment of the invention, the LPG ID can either be a randomly assigned number or predefined by a hash function. The hash function can account for the location of the LPG, if available, the MAC address of the first moving device within the LPG or the VIN number of the first moving device within the LPG. The lower portion of the IP address can be the same EUI64 1302 number as used for the intra-LPG communication IP address.

In one embodiment, any moving device can be assigned any IP address. In another embodiment, a specific IP address can be reserved for different classes of moving devices. For example, an emergency vehicle can be assigned a specific range of IP addresses. An IP address within this range will be saved for emergency vehicles such as ambulances, polices cars, and fire trucks. An external wireless device or gateway will be aware of special moving devices and have a list of the special moving devices or classifications of moving devices stored in memory. These special vehicles must use a special query for requesting an IP address.

This would facilitate priority messages from emergency vehicles. In other words, all messages originating from a specific range of IP addresses would have the highest priority for transmission.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A method for organizing and maintaining an ad-hoc network for communication between a plurality of moving devices comprising the steps of:
    (a) (a) grouping said plurality of moving devices into at least one local peer group (LPG);
    (b) ordering said plurality of moving devices within each LPG based upon a relative position of each of said plurality of devices within each LPG; and
    (c) assigning a unique identifier for each of said plurality of moving devices, where said unique identifier is based in part on the LPG in which the corresponding moving device is located, and
    wherein said unique identifier is an IP address that is assigned based upon a predefined network prefix concatenated with a unique LPG identification and a unique moving device identification; and
    wherein said LPGs are divided into equivalent cells (EC) defined by a group of moving devices that are within a one hop of each other such that only one transmission of a message is needed to reach any of the group of moving devices within the EC, said EC is controlled by an equivalent cell header (ECH) device; and
    wherein a plurality of ECs form a linearly linked chain structure and the ECH device in each EC releases control messages and the non-ECH devices only listen for control messages.

2. The method of claim 1, wherein step b includes reordering said plurality of moving devices based upon a change in the relative position of the plurality of moving devices which is caused by motion of said plurality of moving devices.

3. The method of claim 1, wherein step c includes modifying said unique identifier for a moving device when said moving device changes LPGs.

4. The method of claim 1, wherein a message is routed within an LPG based upon the ordering of the plurality of moving devices and further based upon a type of communication message.

5. The method of claim 1, wherein step c includes assigning two IP addresses when a moving device is located near a border of two adjacent LPGs or within an overlapping area of said adjacent LPGs to allow for communication between the adjacent LPGs.

6. The method of claim 1, wherein at least one LPG is a stationary LPG, said at least one stationary LPG has a fixed location that is predefined.

7. The method of claim 1, wherein said LPG is at least one dynamic LPG, said dynamic LPG is formed based upon a clustering of one or more of said plurality of moving devices.

8. The method of claim 1, wherein said unique LPG identification and said unique moving device identification are calculated from a hash function.

9. The method of claim 1, wherein said unique LPG identification and said unique moving device identification are provided from an external wireless device in communication with the plurality of moving devices.

10. The method of claim 1, wherein each of said plurality of moving devices are classified according to a type of moving device and said unique identifier is assigned based upon said classification.

11. The method of claim 1, wherein step b comprises the step of:
    creating a position vector representing the relative position of each moving device within each LPG.

12. The method of claim 11, wherein the step of creating a position vector comprises the steps of:
    initializing the position vector;
    broadcasting said initialized position vector to another moving device that is joining the LPG;
    comparing, by said another moving device, its position with position information that is included in said broadcast;
    inserting a position value of said another moving device into said position vector based upon the comparison; and
    broadcasting an updated position vector to all other moving devices within the LPG.

13. The method of claim 12, wherein upon receipt of said updated position vector at least one of said other moving devices modify its position in the updated position vector based upon its change in relative position.

14. A method for organizing and maintaining an ad-hoc network for communication between a plurality of moving devices comprising the steps of:
    (a) grouping said plurality of moving devices into at least one local peer group (LPG);
    (b) ordering said plurality of moving devices within each LPG based upon a relative position of each of said plurality of devices within each LPG; and
    (c) assigning a unique identifier for each of said plurality of moving devices, where said unique identifier is based in part on the LPG in which the corresponding moving device is located;
    wherein the step b comprises the steps of:
    broadcasting a message including a first moving device's position, an indication of an intended message direction, and a time of the broadcast;
    receiving said broadcast message by a second moving device;
    estimating a displacement of said first moving device based upon said received broadcast message;

calculating a current position for said first moving device based upon said estimated displacement and said first moving device's position; and comparing said calculated current position with a position of said second moving device.

15. The method of claim 14, wherein said second moving device will relay the message when the second moving device is determined to be along the intended message direction.

* * * * *

UNITED STATES PATENT AND TRADEMARK OFFICE
CERTIFICATE OF CORRECTION

| | | |
|---|---|---|
| PATENT NO. | : 7,720,026 B2 | Page 1 of 1 |
| APPLICATION NO. | : 11/329527 | |
| DATED | : May 18, 2010 | |
| INVENTOR(S) | : Chen et al. | |

It is certified that error appears in the above-identified patent and that said Letters Patent is hereby corrected as shown below:

On the Title Page, Item (73), under "Assignees", in Column 1, Line 3, delete "(JP)" and insert -- Tokyo, (JP) --, therefor.

In the Specification

In Column 5, Line 20, delete "depicts" and insert -- depict --, therefor.

In Column 12, Line 36, delete "EC 1 702" and insert -- EC 2 702 --, therefor.

In Column 16, Line 33, delete "EUI 1302," and insert -- EUI64 1302, --, therefor.

In the Claims

In Column 17, Line 38, in Claim 1, delete "(a) (a)" and insert -- (a) --, therefor.

Signed and Sealed this
Twenty-fifth Day of November, 2014

Michelle K. Lee
*Deputy Director of the United States Patent and Trademark Office*